United States Patent
Ohashi et al.

(10) Patent No.: US 10,731,712 B2
(45) Date of Patent: Aug. 4, 2020

(54) FRICTION PLATE

(71) Applicant: DYNAX CORPORATION, Chitose-shi, Hokkaido (JP)

(72) Inventors: Ryo Ohashi, Chitose (JP); Norio Takakura, Sapporo (JP)

(73) Assignee: DYNAX CORPORATION, Chitose-Shi, Hokkaido (JP)

( * ) Notice: Subject to any disclaimer, the term of this patent is extended or adjusted under 35 U.S.C. 154(b) by 325 days.

(21) Appl. No.: 15/603,507

(22) Filed: May 24, 2017

(65) Prior Publication Data
US 2017/0350456 A1    Dec. 7, 2017

(30) Foreign Application Priority Data

Jun. 1, 2016 (JP) .................. 2016-110179

(51) Int. Cl.
| | |
|---|---|
| *F16D 69/00* | (2006.01) |
| *F16D 13/64* | (2006.01) |
| *F16D 13/74* | (2006.01) |
| *F16D 13/58* | (2006.01) |
| *F16D 13/72* | (2006.01) |
| *F16D 25/12* | (2006.01) |

(52) U.S. Cl.
CPC .............. *F16D 13/74* (2013.01); *F16D 13/58* (2013.01); *F16D 13/64* (2013.01); *F16D 13/648* (2013.01); *F16D 13/72* (2013.01); *F16D 25/123* (2013.01); *F16D 2069/004* (2013.01); *F16D 2300/0214* (2013.01)

(58) Field of Classification Search
None
See application file for complete search history.

(56) References Cited

U.S. PATENT DOCUMENTS

| | | | | |
|---|---|---|---|---|
| 2,690,248 A | * | 9/1954 | McDowall | ............ F16D 13/648 |
| | | | | 188/218 XL |
| 3,493,087 A | * | 2/1970 | Truemper | ................ B66D 5/00 |
| | | | | 188/134 |
| 2005/0224310 A1 | | 10/2005 | Li et al. | |

(Continued)

FOREIGN PATENT DOCUMENTS

| | | | | |
|---|---|---|---|---|
| DE | 102010021900 A1 | * | 12/2011 | ............. F16D 13/72 |
| DE | 102013011677 A1 | * | 1/2015 | ........... F16D 13/648 |

(Continued)

*Primary Examiner* — Charles A Fox
*Assistant Examiner* — Ryan P Dodd
(74) *Attorney, Agent, or Firm* — Rankin, Hill & Clark LLP

(57) ABSTRACT

Problem—To provide a friction plate with reduced drag torque.
Solution—The friction plate is formed with oil grooves having the sectorial shapes spreading toward the inner circumference and the perimeter. The adjacent edges of the friction material segments are provided with the perimeter side vertex and the inner circumference side vertex respectively. The sectorial oil groove opening toward the perimeter side from the inner circumferential side vertexes can discharge a lube oil to the perimeter side efficiently by a centrifugal force. Also, owing to the sectorial oil groove opening toward the inner circumference side from the perimeter side vertexes, a lube oil can be made to run aground onto the friction material segments due to a centrifugal force, thus, reducing the drag torque markedly compared with the conventional plates.

4 Claims, 2 Drawing Sheets

(56) References Cited

U.S. PATENT DOCUMENTS

| | | | | |
|---|---|---|---|---|
| 2006/0090979 A1* | 5/2006 | Asai | ................... | F16D 13/648 |
| | | | | 192/107 R |
| 2006/0090980 A1* | 5/2006 | Kinoshita | ............. | F16D 13/648 |
| | | | | 192/113.36 |
| 2009/0050434 A1* | 2/2009 | Okamura | .............. | F16D 13/648 |
| | | | | 192/113.36 |
| 2012/0175216 A1* | 7/2012 | Hiramatsu | ............ | F16D 13/648 |
| | | | | 192/107 R |
| 2013/0168199 A1* | 7/2013 | Higashijima | ........... | F16D 13/64 |
| | | | | 192/107 M |
| 2014/0346003 A1* | 11/2014 | Okamura | ................ | F16D 13/64 |
| | | | | 192/107 M |
| 2015/0275985 A1* | 10/2015 | Okamura | ................ | F16D 13/74 |
| | | | | 192/113.36 |
| 2015/0369302 A1 | 12/2015 | Takabayashi et al. | | |

FOREIGN PATENT DOCUMENTS

| | | |
|---|---|---|
| JP | 2005-265186 | 9/2005 |
| JP | 2014-169785 | 9/2014 |

\* cited by examiner

FRICTION PLATE

TECHNICAL FIELD

The present disclosure relates to a friction plate used for a wet type clutch which carries out friction engaging of friction plates (wet type friction plates) with mating plates which are soaked in lubricating oil so as to transmit a torque.

BACKGROUND

Wet type clutches usually include two or more mating plates which rotate in conjunction with one shaft and friction plates disposed alternately between the mating plates so as to rotate in conjunction with another shaft. As a piston operates, those plates come into friction engagement with each other, and a torque may be transmitted between those two shafts. Mating plates and friction plates are soaked in lubricating oil so as to be cooled down by lubricating oil. Friction material is bonded on the faces of the friction plates opposing the mating plates (both sides). Oil grooves are usually provided between the adjacent friction material segments, or in the friction materials in the radial direction so that lubricating oil may be discharged by a centrifugal force to the perimeter sides of the friction plates.

When the piston is not operating in a wet type clutch, namely the clutch is out of engagement, it is ideal that a torque not be transmitted at all between the mating plates and friction plates so as to not cause power loss. In practice, however, in a wet type clutch even in non-engaging-of-clutch state, a small amount of torque is likely to be transmitted between the mating plates and the friction plates. This is an occurrence of drag torque leading to a power loss through a lubricant at the time of disengagement of the clutch based on the shear resistance force of the lubricant.

It is known that the drag torque may be reduced by increasing the content of air in the lubricating oil. Also, in order to reduce the drag torque, friction plates provided with various-shaped friction materials and oil grooves have been devised so far, and some are disclosed in the following examples.

DESCRIPTION OF RELATED ART

Patent Document 1—Provisional publication of patent 2005-265186

Patent Document 2—Provisional publication of patent 2014-169785

A friction plate which is useful to increase the content of air of a lube oil so as to reduce the drag torque is disclosed in Patent Document 1 in which it is proposed to specify the inlet angle of the sector of the oil groove spreading inwardly, and the ratio of the radial dimension of the sector to the whole dimension of the oil groove with a view to increasing the air content in the lube.

On the other hand, in Patent Document 2, a friction plate is disclosed in which the friction material is provided with an oil groove which is open at the perimeter side and closed within the friction material and an oil groove formed by the adjacent friction material segments so that it is radially open but narrows towards the perimeter side with the similar object.

According to the friction plates based on Patent Documents 1 and 2, the drag torque can be reduced to some extent; but, the demand for the less drag torque friction plates is steadily increasing as the request for a miniaturization of a wet type clutch is on the rise in which the distance between the friction plate and the mating plate in the disengagement has become much smaller these days.

BRIEF DESCRIPTION

According to one aspect, one object of the present disclosure is to offer friction plates with a lesser degree drag torque in view of the problems of the conventional technology mentioned above.

According to the same or another aspect, a friction plate has a plurality of friction material segments that are fixed in the circumferential direction of an annular plate, and has radial oil grooves formed between adjacent friction material segments. Each of the friction material segments is provided with a vertex on a radially extending edge, wherein the vertexes of adjacent edges of the friction material segments are facing with each other, each oil groove forms sectors spreading outwardly and inwardly from the facing vertexes, and the vertexes are composed of an inner circumference side vertex located in the inner circumference side from the radially intermediate point of the oil groove and a perimeter side vertex located in the perimeter side from the radially intermediate point.

According to still another aspect, advantages provided can include the provision of oil grooves having the shapes of sectors spreading toward the inner circumference and the perimeter starting from the inner circumference side vertexes and the perimeter side vertexes respectively are formed. In case the oil groove is formed by the adjacent friction material segments having the inner circumference side vertexes, the sectorial contour of the radially outer side can be larger than that of the radially inner side. On the other hand, in case the oil groove is formed by the adjacent friction material segments having the perimeter circumference side vertexes, the sectorial contour of the radially inner side can be larger than that of the radially outer side. For this reason, the following advantages may be produced. First, a lube oil can be caused to run aground onto the friction material segments by a centrifugal force in the oil grooves having the perimeter side vertexes, and also, the oil grooves having the inner circumference side vertexes can efficiently discharge the lube by the centrifugal force. Therefore, the drag torque can be reduced markedly compared with the conventional technology.

Moreover, if the adjacent friction material segments which form the oil groove having the inner circumference side vertexes or the perimeter side vertexes are separated too much, the reduction effect of the drag torque cannot fully be demonstrated, so that it may be preferable to locate them within the range of 0.5 degree-3.5 degrees about the center of the plate.

Moreover, it may be preferable to arrange the oil grooves characterized by the inner circumference side vertexes and the perimeter side vertexes alternatingly in the circumferential direction at least partly, since the oil grooves having the inner circumference side vertexes and the perimeter side vertexes can be disposed in the largest number in the circumferential direction by so doing.

Further, by setting the opening angle of the sectorial shape to be in the range of 10 degrees-30 degrees, a discharging effect of the lube oil and the running aground capability of the lube oil can be improved.

DETAILED DESCRIPTION

Hereinafter, with reference to FIGS. 1 and 2, an exemplary embodiment of the present disclosure will be explained. However, the present disclosure is not limited to this embodiment. In addition, although the friction plate of the present disclosure is used for a wet type clutch, since a fundamental structure of a wet type clutch is well known, a detailed demonstration accompanied by illustration of a wet type clutch itself is omitted.

Figure 1:
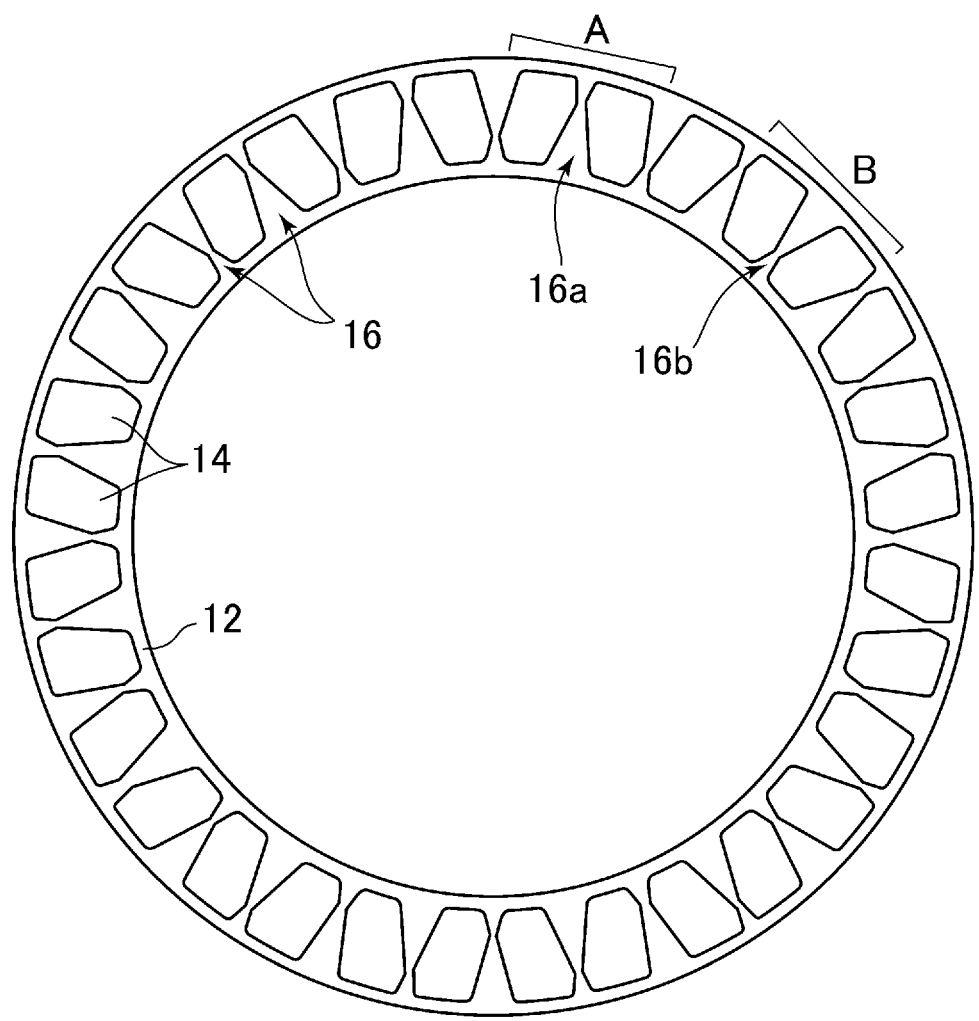
FIG. 1 is a partial front view of the friction plate according to one exemplary embodiment.

As shown in FIG. 1, the friction plate 10 of the illustrated embodiment is comprised of an annular plate 12, and two or more friction material segments 14 are fixed in the circumferential direction on the plate 12. The friction material segments 14 are also fixed on the back side of the plate 12 in the same arrangement. The oil groove 16 is formed by the adjacent friction material segments 14 passing from the inner circumference side to the perimeter side of the plate 12. The plate 12 and the friction material 14 can be made in a conventional manner using a well-known technology. In addition, instead of bonding the frictional material segments on the plate 12 as illustrated, a piece of an annular friction material may be bonded on the plate 12 and oil grooves 16 can be formed by means of pressing operation.

Each oil groove 16 forms a pair of sectors which spread in both directions, namely, toward the side of inner circumference and the perimeter. In FIG. 1, in the position shown by A, the oil groove 16a formed by the adjacent friction material segments 14 has sectors, namely, the larger, inner one and the smaller outer one. Also, in the position shown by B, the oil groove 16b formed by the adjacent friction material segments 14 has sectors, namely, the larger, outer one and the smaller, inner one. The oil groove 16a and the oil groove 16b do not necessarily need to be arranged in the direction of a circumference alternatingly as illustrated. For example, oil grooves of other contours may be provided in addition to the oil groove 16a and the oil groove 16b, and the oil groove 16a or oil groove 16b may be repeated in the direction of a circumference by appropriately modifying the shapes of the friction material segments. However, it may be preferable to arrange alternately the perimeter side vertexes 14a and the inner circumference side vertexes 14b (as shown in FIG. 2) in the circumferential direction so as to dispose the oil groove 16a and the oil groove 16b in the circumferential direction alternately, as it serves to arrange the oil groove 16a and 16b as many as possible on the plate 12.

When the wet type clutch in which the friction plate 10 is applied is in a disengagement state, the lubricating oil dragged by the mating plate (illustration omitted) moves to the perimeter side by a centrifugal force, being dragged in the circumferential direction of the friction plate 10. At this time, owing to the configuration of the oil groove 16a where the width narrows toward the perimeter side, the lubricating oil passing through the oil groove 16a overflows and runs aground on the friction material segment 14 causing a separating force. On the other hand, the lubricant which passes through the oil groove 16b, may be efficiently discharged toward the perimeter side owing to the configuration of the oil groove 16b spreading outwardly. For this reason, while the lube oil runs aground onto the friction material segments 14 making the content of air increase, the lube oil can be efficiently discharged to the perimeter side of the friction plate 10, thus, remarkably reducing the drag torque.

Figure 2:
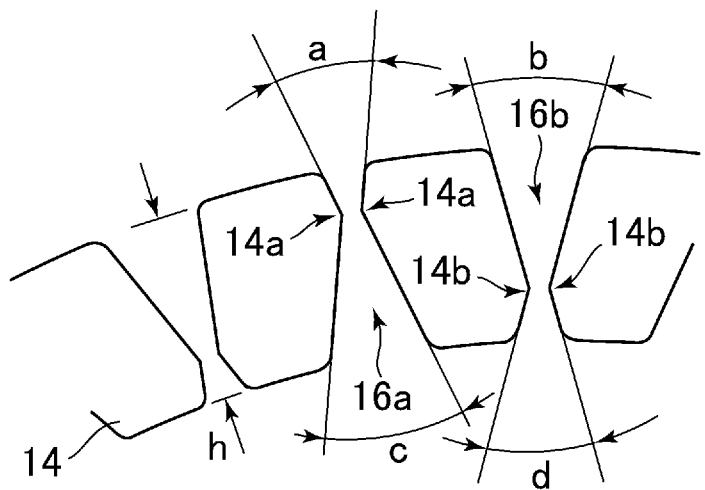
FIG. 2 is an enlarged view of a principal part of FIG. 1.

As shown in FIG. 2, the sectors of the oil groove 16a formed by the adjacent edges of the friction material segments 14 are characterized by the perimeter side vertexes 14a. On the other hand, the sectors of the oil groove 16b formed by the adjacent edges of the friction materials 14 are characterized by the inner circumference side vertexes 14b. When the radial dimension h of the oil groove 16 formed by the adjacent friction material segments 14 is bisected in the radial direction, the vertex located in the perimeter side is the perimeter side vertex 14a, and the vertex located in the inner circumference side is the inner circumference side vertex 14b. It may be necessary that the facing perimeter side vertexes 14a and inner circumference side vertexes 14b should not be in contact with each other. On the other hand, a pair of the friction material segments 14 having the facing perimeter side vertexes 14a and the inner circumference side vertexes 14b can be pertinently disposed in the range of 0.5 degree-3.5 degrees about the center of the plate 12. It is because the advantages of the present disclosure cannot fully be demonstrated if the adjacent friction material segments 14 having the perimeter side vertex 14a or the inner circumference side vertex 14b separate too much. In short, the appropriate center angle will depend upon the diameter of the plate 12.

It has been found that against the radial dimension h of the oil groove 16 measured from the inner circumference, the location of the perimeter side vertex 14a can be 60%-80% in order that the lube oil can run aground onto the friction material 14 with ease. Likewise, when the inner circumference side vertex 14b is located within the limits of 20%-40% of the dimension h, it can make a lube oil discharge smoothly. The perimeter side vertex 14a and the inner circumference side vertex 14b need to be formed so that they may face with each other on the adjacent friction material segments 14, but the vertexes do not need to be sharp but may be somewhat roundish.

Moreover, the sectorial opening angles a, b, c and d as regards the perimeter side vertex 14a or the inner circumference side vertex 14b can be within the limits of 10 degrees-30 degrees. By so doing, it is possible to produce friction plates suited to improve the discharging efficiency of a lube oil, and to cause a lube oil to run aground easily onto the friction materials.

Furthermore, provision of the perimeter side vertex 14a and the inner circumference side vertex 14b on a pair of the radially extending edges of a friction material segment sandwiched by the adjacent oil grooves 16a and 16b may be desirable, since by so doing, the oil groove 16a and the oil groove 16b can be arranged alternately over the whole annular surface of the plate 12.

Only one embodiment of the present disclosure is explained hereinabove. It is to be noted, however, that the oil grooves 16a and 16b need to be formed partly on the friction plate 10, and in the remaining part, oil grooves of other contours (not shown) may be provided.

According to the present disclosure, as explained above, the discharging efficiency of a lube oil can be increased, and also the content of air of a lube oil can be caused to increase significantly so that friction plates with less drag torque can be provided.

EXPLANATION OF REFERENCES

10 Friction plate
12 Plate
14 Friction material segment
14a Vertex (perimeter side vertex)

14b Vertex (inner circumference side vertex)
16 Oil groove

The invention claimed is:

1. A friction plate in which a plurality of friction material segments are fixed in a circumferential direction of an annular plate, and radial oil grooves are formed between adjacent friction material segments, wherein each of said friction material segments is provided with radially extending side edges and a vertex formed on each radially extending side edge, vertexes of adjacent side edges of the friction material segments facing with each other, each oil groove forming sectors spreading both outwardly and inwardly from said facing vertexes, and said facing vertexes for each oil groove being composed of an inner circumference side vertex located in an inner circumference side from a radially intermediate point of the oil groove or a perimeter side vertex located in a perimeter side from the radially intermediate point.

2. The friction plate according to claim 1 in which said oil grooves having said facing inner circumference side vertexes and said another oil grooves having said facing perimeter side vertexes are alternatingly located in at least a part of the whole circumference.

3. The friction plate according to claim 1 in which each of the sectorial shapes of the oil grooves has an opening angle in the range of 10 degrees to 30 degrees.

4. The friction plate according to claim 2 in which each of sectorial shapes of the oil grooves has an opening angle in the range of 10 degrees to 30 degrees.

\* \* \* \* \*